M. W. Lyman.
Pocket Knife.
No. 110,986. Patented Jan. 19, 1871.
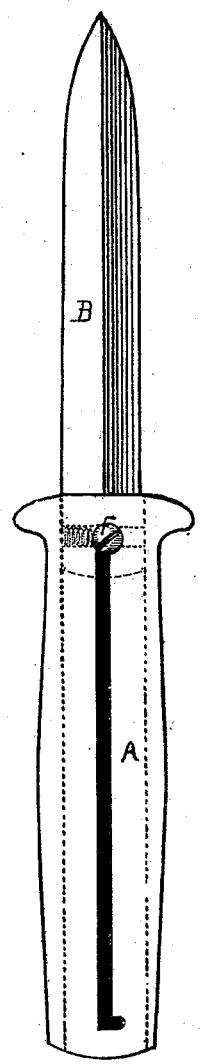
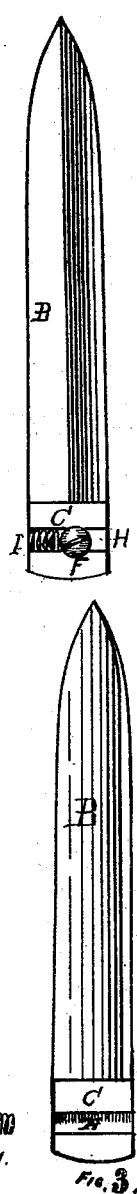
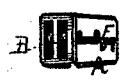
Witnesses.
Inventor,
Myron W. Lyman.
By Farwell, Ellsworth & Co.
Attorneys

United States Patent Office.

MYRON W. LYMAN, OF CHICAGO, ILLINOIS.

Letters Patent No. 110,986, dated January 17, 1871.

---

IMPROVEMENT IN CUTLERY.

---

The Schedule referred to in these Letters Patent and making part of the same.

---

*To all whom it may concern:*

Be it known that I, MYRON W. LYMAN, of Chicago, in the county of Cook and State of Illinois, have invented an Improved Cutlery; and I do hereby declare the following to be a full, clear, and exact description thereof, which will enable others skilled in the art to which my invention appertains to make and use the same, reference being had to the accompanying drawing forming part of this specification.

Figure 1 is plan view of a dirk-knife with the blade extended, constructed in accordance with my invention.

Figure 2 is a plan view of the two-edged dirk-blade detached from the handle.

Figure 3 is a plan view of a hunting-blade having a single cutting-edge.

Figure 4 is a plan view of a pocket-knife having two or more blades.

Figure 5 is a plan view of the reverse side of fig. 4.

Figure 6 is a perspective view of a four-bladed pocket-knife.

Figures 7, 8, and 9 are detached views of parts to be hereinafter referred to.

Similar letters of reference indicate corresponding parts in the several figures of the drawing.

My invention has for its object to improve the construction of cutlery, dental and surgical tools, and other instruments of like nature, whereby they are rendered more economical in construction and efficient in operation.

It consists in the combination of devices by which one or more sliding blades are adapted to be extended and withdrawn within the handle and locked in either position, as will be hereinafter more fully described.

For convenience of description I have shown my invention, in the accompanying drawing, applied to several varieties of knives; but it must be understood that, while the description is confined to the devices shown, the invention is applicable to surgical and dental tools and every variety of cutlery.

Referring to fig. 1—

A is the handle, and

B, the blade of a dirk-knife.

The handle A is constructed in one or more pieces, with all its sides and one end closed, or not, as may seem best in making.

The shank C of the blade is flattened or otherwise formed to correspond with the longitudinal recess formed in the handle, as shown by dotted lines fig. 1.

The shank of the blade is inserted in the end of the handle, and fits the same with close contact.

It is secured in place in the following manner:

D is a narrow slot formed longitudinally through one side of the handle, with short rectangular terminations near each end of the latter.

Through these slots the shank of a screw, F, is inserted, which screws into a small block or plate, G, adapted to fit snugly within a groove, H, formed transversely through one side of the blade-shank C.

I is a coiled or other suitably-shaped spring, as shown in fig. 7, placed within the groove H, between the side of the handle and the plate G.

When the blade is extended, as shown in fig. 1, the spring I forces the screw-shank into the short angular portion of the slot D, and holds the blade firmly in position against the possibility of closing until the spring is compressed to permit the passage of the screw-shank through the main portion of the slot.

The blade, when withdrawn within the handle, is locked in place by the screw-shank entering the angle at the inner end of the slot D, as will be readily understood.

By this arrangement the handle may be grasped in one hand and the blade opened or closed by one motion of the thumb.

In fig. 4 a three-bladed knife is shown, with the slots D arranged to accommodate the necessary blades.

One side, as shown in the figure, is provided with two short slots, while the reverse side, as shown in fig. 5, is formed with a slot to accommodate the long blade.

In a four-bladed knife one side may be provided with a long and a short slot to accommodate the long blade and the file-blade, as will be understood without further description.

Any number of blades of any desired form may be applied to a handle in the most simple and effectual manner.

By my invention the back spring, employed in common pocket-knives to hold the blades open and closed, is dispensed with, thereby not only reducing the cost of construction, but also avoiding the liability of blades becoming loose and inoperative in the handle, or shutting up and cutting the fingers when used by careless or inexperienced persons.

It also does away with the method of attaching the blades to handles by rivets, and therefore renders the connection of the parts much stronger and less liable to become displaced.

In pocket-knives, as usually constructed, the shank of the blade, when the latter is opened, extends somewhat beyond the handle, and, therefore, reduces the length of the cutting-edge.

By my invention the cutting-edge extends to the handle, while the shank is entirely within the latter, whereby a cutting-edge is formed next the handle, that being the point at which it is most effective.

The whole length of the blade is shortened somewhat, but the cutting-edge is equal in length to that of the ordinary knife-blade. It is, therefore, apparent that the length of handle is not increased.

When the blades are closed or drawn into the handle there are no projecting parts to cut and wear the pocket, as in the ordinary knives.

One of the greatest advantages gained by my invention in the manufacture of cutlery is that all the parts, with the exception of the blades, can easily be made by machinery, instead of by the expensive hand-labor now employed.

This, therefore, cheapens materially the cost of manufacture, while it admits the duplication of blades and parts at a trifling expense.

The facility with which the knife can be opened renders it of much value, inasmuch as women and children can easily extend or close the blades without injury to the finger-nails.

Having thus described my invention,

What I claim as new, and desire to secure by Letters Patent, is—

In combination with a slotted handle, one or more blades having a transverse groove, H, the spring I, plate G, and operating-screw F, substantially as described, for the purpose specified.

MYRON W. LYMAN.

Witnesses:
J. EDWARDS FAY,
STILLMAN R. BINGHAM.